United States Patent [19]

Nerad et al.

[11] Patent Number: 5,593,615

[45] Date of Patent: Jan. 14, 1997

[54] LIGHT MODULATING DEVICE HAVING A MATRIX PREPARED FROM ACID REACTANTS

[75] Inventors: Bruce A. Nerad, Oakdale, Minn.; George F. Vesley, Hudson, Wis.

[73] Assignee: Minnesota Mining and Manufacturing Company, St. Paul, Minn.

[21] Appl. No.: 484,690

[22] Filed: Jun. 7, 1995

Related U.S. Application Data

[63] Continuation of Ser. No. 235,101, Apr. 29, 1994, abandoned.

[51] Int. Cl.[6] .............................. C09K 19/52; G02F 1/13
[52] U.S. Cl. .......................... 252/299.01; 349/89
[58] Field of Search ................ 252/299.01; 359/51, 359/52

[56] References Cited

U.S. PATENT DOCUMENTS

| | | | |
|---|---|---|---|
| 3,731,986 | 5/1973 | Fergason | 359/52 X |
| 3,935,337 | 1/1976 | Taylor | 427/180 |
| 4,411,495 | 10/1983 | Beni et al. | 359/43 X |
| 4,435,047 | 3/1984 | Fergason | 359/52 X |
| 4,501,503 | 2/1985 | Buirley et al. | 374/162 |
| 4,556,289 | 12/1985 | Fergason | 359/52 X |
| 4,616,903 | 10/1986 | Fergason | 359/52 X |
| 4,671,618 | 6/1987 | Wu et al. | 359/52 X |
| 4,673,255 | 6/1987 | West et al. | 359/51 X |
| 4,685,771 | 8/1987 | West et al. | 359/46 X |
| 4,688,900 | 8/1987 | Doane et al. | 359/52 X |
| 4,699,470 | 10/1987 | McLaughlin et al. | 359/51 X |
| 4,707,080 | 11/1987 | Fergason | 359/52 X |
| 4,728,547 | 3/1988 | Vaz et al. | 428/1 |
| 4,749,261 | 6/1988 | McLaughlin et al. | 359/52 X |
| 4,789,858 | 12/1988 | Fergason et al. | 340/784 |
| 4,818,070 | 4/1989 | Gunjima et al. | 359/51 X |
| 4,834,509 | 5/1989 | Gunjima et al. | 359/51 X |
| 4,850,683 | 7/1989 | Kawaguchi et al. | 359/52 X |
| 4,869,847 | 9/1989 | Leslie | 252/299.01 |
| 4,888,126 | 12/1989 | Mullen et al. | 252/299.5 |
| 4,890,902 | 1/1990 | Doane et al. | 359/56 X |
| 4,891,152 | 1/1990 | Miller et al. | 252/299.5 |
| 4,911,536 | 3/1990 | Ditzik | 359/51 X |
| 4,938,568 | 7/1990 | Margerum et al. | 359/3 |
| 4,944,576 | 7/1990 | Lacker et al. | 359/51 |
| 4,950,052 | 8/1990 | Fergason et al. | 359/52 X |
| 4,971,719 | 11/1990 | Vaz et al. | 252/299.5 |
| 4,992,201 | 2/1991 | Pearlman | 252/299.1 |
| 5,004,323 | 4/1991 | West et al. | 359/103 X |
| 5,011,624 | 4/1991 | Yamagishi et al. | 252/299.5 |
| 5,021,188 | 6/1991 | Vaz et al. | 252/299.5 |
| 5,053,889 | 10/1991 | Nakano et al. | 358/480 |
| 5,056,898 | 10/1991 | Ma et al. | 359/94 |
| 5,087,387 | 2/1992 | Mullen et al. | 252/299.5 |
| 5,096,282 | 3/1992 | Margerum et al. | 359/3 |

(List continued on next page.)

FOREIGN PATENT DOCUMENTS

| | | |
|---|---|---|
| 313053 | 4/1989 | European Pat. Off. |
| 90/02054 | 3/1990 | WIPO |
| 91/01511 | 2/1991 | WIPO |
| WO92/12219 | 7/1992 | WIPO |
| 9309202 | 5/1993 | WIPO |
| WO93/09202 | 5/1993 | WIPO |
| 94/06050 | 3/1994 | WIPO |

OTHER PUBLICATIONS

Database WPI, Week 9345, Derwent Publications, Ltd. AN 93-354141 & JP,A,05 257 134.

Yamagishi et al., SPIE vol. 80, *Liquid Crystal Chemistry, Physics, and Applications*, pp. 24–31 (1989).

(List continued on next page.)

*Primary Examiner*—Cynthia Harris Kelly
*Attorney, Agent, or Firm*—Gary L. Griswold; Walter N. Kirn; Robert W. Sprague

[57] ABSTRACT

An optically responsive film that includes liquid crystal dispersed in a polymer matrix that includes the reaction product of (1) one or more polymerizable matrix reactants other than an acid reactant and (2) at least one copolymerizable acid reactant.

24 Claims, 2 Drawing Sheets

U.S. PATENT DOCUMENTS

| | | |
|---|---|---|
| 5,116,528 | 3/1992 | Mullen et al. ................ 252/299.5 |
| 5,142,389 | 8/1992 | Fergason ...................... 359/53 |
| 5,188,760 | 2/1993 | Hikmet et al. ................ 252/299.01 |
| 5,202,063 | 4/1993 | Andrews et al. ............... 264/4.6 |
| 5,211,876 | 5/1993 | Vaz et al. .................... 252/299.01 |
| 5,225,104 | 7/1993 | Van Steenkiste et al. ........ 252/299.01 |
| 5,268,783 | 12/1993 | Yoshinaga et al. ............. 359/103 |
| 5,270,843 | 12/1993 | Wang .......................... 359/52 |
| 5,286,408 | 2/1994 | Naemura et al. ................ 252/299.01 |
| 5,296,952 | 3/1994 | Takatsu et al. ................ 359/53 |
| 5,304,323 | 4/1994 | Arai et al. ................... 252/299.5 |
| 5,323,251 | 6/1994 | Coates et al. ................. 359/51 |
| 5,327,271 | 7/1994 | Takeuchi et al. ............... 359/75 |
| 5,342,545 | 8/1994 | Yamada et al. ................. 252/299.01 |
| 5,344,587 | 9/1994 | Coates et al. ................. 252/299.6 |

OTHER PUBLICATIONS

Yamaguchi et al., *J. Soc. Inf. Disp.*, 1(3):347 (1993).
Zhang et al., Proc. SPIE 1815:233 (1992).
Levy et al., *Materials Letters*, 10:470 (1991).
Levy et al., *J. Non–Cryst. Solids*, 147–48:646 (1992).
West et al., *Appl. Phys. Lett.*, 60(26) (1992).
West, *ACS Symp. Ser.*, 435:475 (1990).
Craighead et al., *Appl. Phys. Letter*, 40(1):22 (1982).
Doane et al., *Mol. Cryst. Liq. Cryst.*, 165:511 (1988).
West, *Mol. Cryst. Liq. Cryst. Inc. NonLin. Opt.*, 157:427 (1988).
Lackner et al., *Liq. Cryst. Chem. Phys. & Appl.*, SPIE 1080:53 (1989).
Montgomery, SPIE 958:104 (1988).
Hirai et al., SPIE 1257:2 (1990).
Nolen et al., *Mol. Cryst. Liq. Cryst. Lett.* 86(6):129, (1992).
Hikmet et al., *Advanced Materials* 4:679 (1992).
Hikmet et al., *Polymer* 34:1736 (1993).
Yang et al., *IEEE*, pp. 49–52 (1991).
Yang et al., "Cholesteric Liquid Crystal/Polymer Gel Dispersion Reflective Display Application".(1991).
Rout et al., *Jap. J. Appl. Phys.*, 30:L1412 (1991).
Coates, *Displays*, 14(2):94 (1994).
Gotoh et al., *Appl. Phys. Lett.*, 60(3):392 (1992).
Margerum et al., *Liquid Crystals*, 14(2):345 (1993).
Montgomery et al., *Mol. Cryst. Liq. Cryst. Sci. Technol.*, Sect. A., pp. 131–151 (1993).
Mucha, *J Appl. Polym. Sci.*, 53(1):175 (1991).
Sato et al., *Jap. J. Appl. Phys.*, 32(5A):2025 (1993).
Vaz, *Mol. Cryst. Liq. Cryst.*, 146:17 (1987).
Drzaic, *Liq. Cryst.*, 5(5):1467 (1989).
Fuh et al., *J. Appl. Phys.*, 66(11) pp. 5278–5284 (1989).
van Konynenberg et al., SPIE vol. 1080, pp. 62–69 (1989).
Sutherland, SPIE vol. 1080, pp. 83–90 (1989).
Whitehead Jr. et al., SPIE vol. 1080, pp. 250–257 (1989).
Montgomery, SPIE 1S4:577–606 (1986).
van Konynenberg et al., SPIE vol. 823, pp. 143–150 (1987).
Drzaic, *J. Appl. Phys.*, 60(6):2142 (1986).
Drzaic, *Liq. Cryst. Disp. & Appl.*, SPIE 1257:29 (1990).
Doane et al., *Appl. Phys. Lett.*, 49(4):269 (1986).
Smith et al., *Liquid Crystal*, 3(5):543 (1988).
Vaz, "Polymer–dispersed Liquid Crystal Films: Materials and Applications", SPIE 1080–2–10 (1989).
Vaz et al., "A Light Control Film Composed of Liquid Crystal Droplets Dispersed in a UV–Curable Polymer", Liq. Cryst., 1987, vol. 146, pp. 1–14.
Vaz et al., "A Light Control Film Composed of Liquid Crystal Droplets Dispersed in Epoxy Matrix", Mol. Cryst. Liq. Cryst., 1987, vol. 146, pp. 17–34.

LIGHT MODULATING DEVICE HAVING A MATRIX PREPARED FROM ACID REACTANTS

CROSS REFERENCE TO RELATED APPLICATIONS

This is a continuation of application Ser. No. 08/235,101 filed Apr. 29, 1994 abandoned.

This application is related to the following U.S. patent applications which are assigned to the same assignee as the present application and hereby incorporated by reference: (1) Miller et al., U.S. patent application Ser. No. 07/819,260, entitled "Polymer-Dispersed Liquid Crystal Device Having an Ultraviolet-Polymerizable Matrix and a Variable Optical Transmission and a Method for Preparing Same" filed Jan. 10, 1992, which is a continuation-in-part of Miller et al., U.S. patent application Ser. No. 07/640,034 filed Jan. 11, 1991, now abandoned; (2) Nerad et al., U.S. patent application Ser. No. 08/103,271, entitled "Light Modulating Device Having a Silicon-Containing Matrix" filed Aug. 6, 1993; (3) Nerad et al., U.S. patent application Ser. No. 08/235,561, entitled "Light Modulating Device Having a Vinyl Ether-Based Matrix" filed concurrently with the present application; and (4) Vesley et al., U.S. patent application Ser. No. 08/236,545, entitled "Light Modulating Device Having a Matrix Prepared From Allyl Reactants" filed concurrently with the present application.

BACKGROUND OF THE INVENTION

1. Field of the Invention

This invention relates to light modulating devices (e.g., a polymer-dispersed liquid crystal device hereinafter referred to as a "PDLC device").

2. Description of the Related Art

Various types of light modulating devices are known. One type is the so-called PDLC device that includes an electrically responsive liquid crystal layer in which liquid crystal droplets are dispersed throughout a polymer matrix. One way to prepare the liquid crystal layer is by combining the liquid crystal material with a polymerizable matrix precursor and then subjecting the mixture to polymerization conditions. Polymerization causes phase separation of the liquid crystal material, resulting in the formation of liquid crystal droplets dispersed throughout the polymerized matrix.

PDLC devices are translucent in the absence of an electric field due to light scattering and become transparent upon application of the field. Reverse mode PDLC devices are also known. These devices are transparent in the absence of an electric field and become translucent upon application of the field.

Various PDLC matrices are known. They include the polymerization products of epoxy, isocyanate, and certain photo-curable vinyl monomers (e.g., acrylates or the reaction product of a multi-functional thiol with a multi-functional acrylate or a multi-functional allyl).

During manufacture of the PDLC device, the liquid crystal layer typically is placed in contact with one or more thin film electrodes and then laminated between two rigid protective sheets, e.g., glass sheets. During lamination, the sheets can be distorted by the temperatures and pressures associated with the lamination process. At the conclusion of lamination, the pressure is relieved and the temperature is reduced, allowing the distortions to relax. This relaxation subsequently stresses the liquid crystal layer. If the cohesive strength of the liquid crystal layer and/or the adhesion of the liquid crystal layer to the electrodes is not sufficiently high, the stress will cause the liquid crystal layer to split apart cohesively and/or delaminate from the electrode.

One convenient way to characterize the resistance of a film to delamination or cohesive failure is to measure its T-peel strength. A film with a higher T-peel strength will be much less likely to delaminate or cohesively fail during manufacture.

SUMMARY OF THE INVENTION

In a first aspect, the invention features an optically responsive film that includes liquid crystal dispersed in a polymer matrix that is the reaction product of (1) one or more polymerizable matrix reactants other than an acid reactant and (2) at least one acid reactant copolymerizable with the one or more matrix reactants in an amount sufficient to enhance the T-peel strength of the film (measured according to Test Procedure A, infra) by a factor of at least 2 relative to the same film prepared in the absence of the acid reactant.

As used herein, "acid reactant" refers to a copolymerizable species provided with one or more groups classified as Lewis acids.

"Polymerizable matrix reactant" refers to a monomer, oligomer, or combination thereof that react, along with the acid reactant (e.g., via a chain growth or step growth mechanism, or combination thereof), to form the polymer matrix.

"The same film prepared in the absence of the acid reactant" refers to a film prepared without the acid reactant but using the same matrix reactants and initiator and/or catalyst as the claimed film in which (a) the weight to weight ratio of individual matrix reactants to each other (assuming a composition having more than one matrix reactant) is the same as in the claimed film, (b) the weight to weight ratio of the sum total of all the matrix reactants to the initiator and/or catalyst is the same as the weight to weight ratio of the sum total of all the matrix reactants plus the acid reactant to the initiator and/or catalyst in the claimed film, (c) the weight to weight ratio of the sum total of all the matrix reactants plus initiator and/or catalyst to liquid crystal is the same as the weight to weight ratio of the sum total of all the matrix reactants plus acid reactant plus initiator and/or catalyst to liquid crystal in the claimed film, and (d) the film is prepared under substantially the same process conditions (e.g., temperature and light intensity) as the claimed film.

In preferred embodiments, the amount of the acid reactant is chosen to enhance the T-peel strength by a factor of at least three. The amount of the acid reactant preferably ranges from about 1 to about 30 weight percent (based upon the total weight of matrix reactants plus initiator and/or catalyst), more preferably from about 2 to about 15 weight percent.

Preferably, the acid reactant is a protic acid reactant having one or more acidic hydrogens. The protic acid reactant is preferably used in an amount sufficient to yield a polymer matrix having from about 0.01 to about 0.4 weight percent acidic hydrogens (based upon the total weight of matrix reactants plus initiator and/or catalyst), more preferably from about 0.03 to about 0.2 weight percent. As an example, acrylic acid (molecular weight=72 g/mol) has one acidic hydrogen (molecular weight=1 g/mol) and, if used at 18 weight percent, would provide 0.25 weight percent acidic hydrogens. "Acidic hydrogens" are labile hydrogens from compounds having pKa's preferably less than or equal to 5.

Examples of preferred acid reactants (all of which are protic acid reactants) include unsaturated carboxylic acids (e.g., acrylic acid and methacrylic acid), mono-esters of unsaturated dicarboxylic acids, amine-functional carboxylic acids, hydroxy-functional carboxylic acids, mercapto-functional carboxylic acids, and sulfonic acids.

Examples of preferred matrix reactants include mono- or multi-functional enes (e.g., vinyl ethers, acrylates, and/or methacrylates), thiols, silicon hydrides, alcohols, epoxies, isocyanates, amines, or combinations thereof. A "multi-functional" reactant contains two or more groups that participate in the polymerization reaction, whereas a "mono-functional" reactant contains only one such group. An "ene" is a reactant having a polymerizable carbon-carbon double bond. A "multi-functional ene" is an ene having two or more polymerizable carbon-carbon double bonds.

In one preferred embodiment, the matrix reactant is a multi- and/or mono-functional ene (e.g., an acrylate, methacrylate, vinyl ether, or combination thereof) and the acid reactant includes an unsaturated carboxylic acid.

In a second aspect, the invention features an optically responsive film that includes liquid crystal dispersed in a polymer matrix that is the reaction product of (1) one or more polymerizable matrix reactants other than an acid reactant and (2) at least one acid reactant copolymerizable with the one or more matrix reactants in an amount ranging from about 1 to about 30 weight percent (and preferably from about 2 to about 15 weight percent).

In a third aspect, the invention features an optically responsive film that includes liquid crystal dispersed in a polymer matrix that is the reaction product of (1) one or more polymerizable matrix reactants other than an acid reactant and (2) at least one protic acid reactant copolymerizable with the one or more matrix reactants in an amount sufficient to yield a polymer matrix having from about 0.01 to about 0.4 weight percent acidic hydrogens (based upon the total weight of matrix reactants plus initiator and/or catalyst), and preferably from about 0.03 to about 0.2 weight percent.

The invention further features a light modulating film that includes the above-described optically responsive films to which an electric field is applied through a pair of electrodes.

The invention provides optically responsive films exhibiting improved T-peel strength as a result of copolymerizing an acid reactant into the polymer matrix. As a result, the films resist splitting apart when electrical contact is made to the electrodes and/or during manufacture of the light modulating film.

Other features and advantages of the invention will be apparent from the following description of the preferred embodiments thereof, and from the claims.

BRIEF DESCRIPTION OF THE DRAWINGS

The invention will be more fully understood with reference to the following drawings in which.

DESCRIPTION OF THE PREFERRED EMBODIMENTS

Figure 1:
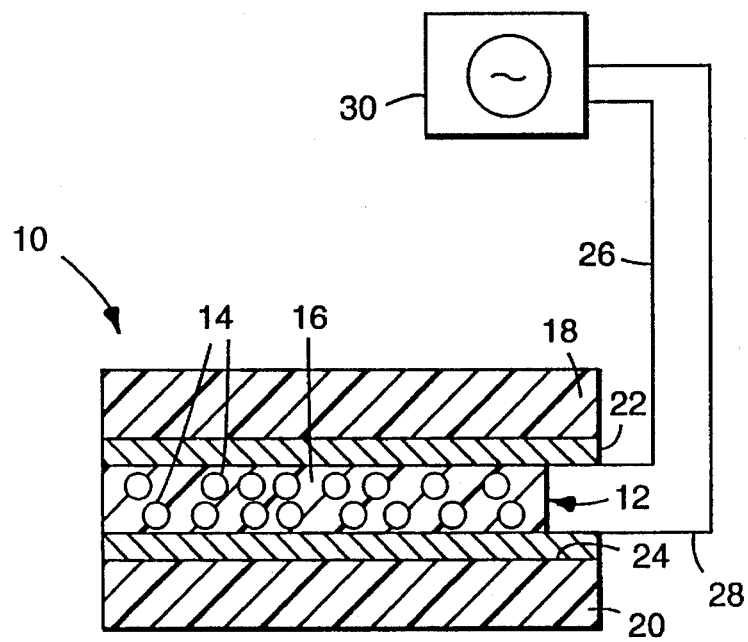
FIG. 1 is a schematic view, partially in cross-section, of a light modulating device according to the invention.

Referring to FIG. 1, there is shown a light modulating device 10 comprising an optically responsive film 12 having a multiplicity of discrete liquid crystal droplets 14 having diameters in the range from about 0.1 to 10 times the wavelength of light to be scattered dispersed in a polymeric matrix 16.

Matrix 16 is the polymerization product of one or more polymerizable matrix reactants other than an acid reactant and one or more copolymerizable acid reactants. The acid reactant enhances the T-peel strength of the optically responsive film (as measured according to Test Procedure A, infra) by a factor of at least 2 (and more preferably by a factor of at least 3) compared to the same film prepared in the absence of the acid reactant (as defined in the Summary of the Invention, above).

Examples of suitable acid reactants include protic acids such as unsaturated carboxylic acids (e.g., acrylic acid, methacrylic acid, crotonic acid, vinyl acetic acid, itaconic acid, maleic acid, fumaric acid, allylacetic acid, cinammic acid, and unsaturated acid-terminated polyester oligomers); mono-esters of dicarboxylic acids (e.g., mono-esters of maleic, fumaric, and itaconic acid); amine-functional carboxylic acids (e.g., aminobenzoic acid, 4-aminophenylacetic acid, and various amino acids); hydroxy-functional carboxylic acids (e.g., 4-hydroxybenzoic acid); mercapto-functional carboxylic acids (e.g., 3-mercaptopropionic acid); sulfonic acids (e.g., hydroxybenzenesulfonic acid and sulfanilic acid), and combinations thereof.

The total amount of acid reactant must be sufficient to achieve the desired enhancement in T-peel strength. However, where flexible films are desired (e.g., in architectural and automotive applications), the amount must not be high enough to cause the film to become hard and inflexible. In addition, the amount preferably is not high enough to cause the film to possess a large amount of "memory" (i.e., an increase in off-state transmission relative to the transmission before the film is powered). Memory is generally largest the first time a film is switched on and off. While the amount of acid reactant depends on the particular acid reactant and the matrix reactants in the polymerizable mixture, in general the amount of acid reactant ranges from about 1 to about 30 weight percent (and more preferably from about 2 to about 15 weight percent) based upon the total weight of matrix reactants plus initiator and/or catalyst.

In the case of protic acid reactants, the amount of acid reactant is preferably sufficient to yield a polymer matrix having from about 0.01 to about 0.4 weight percent acidic hydrogens (based upon the total weight of matrix reactants plus initiator and/or catalyst), more preferably from about 0.03 to about 0.2 weight percent.

Examples of materials with which the acid reactants can be polymerized to form matrix 16 fall into the following classes. Matrix reactants falling within any particular class may be used in combination with each other or in combination with materials in the other classes.

(1) Class I includes mono-functional and multi-functional enes such as acrylates, methacrylates, allyls, acrylamides, methacrylamides, vinyl silanes, vinyl ethers, fumarates, maleates, or combinations thereof.

Examples of mono-functional acrylates and methacrylates include acrylate and methacrylate esters of non-tertiary alkyl alcohols, the molecules of which have from 1 to about 14 carbon atoms. Included within this class of matrix reactants, are, for example, isooctyl acrylate, isononyl acrylate, 2-ethylhexyl acrylate, decyl acrylate, dodecyl acrylate, n-butyl acrylate, hexyl acrylate, isooctyl methacrylate, and lauryl methacrylate.

Examples of multi-functional acrylates and methacrylates include 1,6 hexanedioldiacrylate, trimethylpropane triacrylate, propylene glycol dimethacrylate, pentaerythritol tetraacrylate, and 1,2-ethylene glycol diacrylate.

Examples of mono- and multi-functional allyls include mono-, di-, and triallyl compounds and allyl compounds containing an hydroxyl group reacted with a mono- or multi-functional isocyanate, e.g., triallyl isocyanurate, trimethylolpropane diallyl ether, allyl benzene, allylcyclohexane, diallyldiphenylsilane, and allyl-functional oligomers such as 9460 commercially available from Monomer-Polymer & Dajac Laboratories, Inc., Trevose, Pa.

Examples of mono-functional acrylamides and methacrylamides include N,N-dimethylacrylamide, N,N-diethylacrylamide, N-dodecylmethacrylamide, and N-ethylmethacrylamide.

Examples of multi-functional acrylamides and methacrylamides include 1,6-hexamethylenebisacrylamide, N,N'-octamethylene-bisacrylamide, 1,6-hexamethylenebismethacrylamide, N,N-iso-valerylidene-bis-methacrylamide, and m-xylene-bisacrylamide.

Examples of mono-functional vinyl silanes include vinyltrimethylsilane, vinyltrimethoxysilane, vinyltris(trimethylsiloxy)silane, and siloxanes such as that commercially available from Hüls America under the trade designation "PS408."

Examples of multi-functional vinyl silanes include trivinylmethylsilane, 1,3-divinyltetramethyldisiloxane, 1,3-divinyl-1,3-diphenyl-dimethyldisiloxane, divinyldimethylsilane, divinyldiphenylsilane, 1,1,3,3-tetravinyldimethyldisiloxane, tetravinylsilane, and 1,3,5,7-tetravinyltetramethylcyclotetrasiloxane.

Examples of suitable vinyl ethers include hydroxybutyl vinyl ether (HBVE, commercially available from International Specialty Products, Wayne, N.J.); 1,4-cyclohexanedimethanol divinyl ether (CHVE, commercially available from International Specialty Products, Wayne, N.J.); propenyl ether of propylene carbonate (PEPC, commercially available from International Specialty Products, Wayne, N.J.); triethylene glycol divinyl ether (DVE-3, commercially available from International Specialty Products, Wayne, N.J.); butanediol divinyl ether (commercially available from BASF, Parsippany, N.J.); vinyl ethers commercially available from Allied-Signal Corp., Morristown, N.J. under the tradename "Vectomer" (e.g., Vectomer 2010, 2020, 4010, and 4020); vinyl ether-maleate mixtures commercially available from DSM Resins U.S., Inc., Elgin, Ill. under the tradename "Uralac" (e.g., Uralac 3004-102 and 3004-300); and fluorinated vinyl ethers (e.g., $C_5F_{17}SO_2N(C_2H_5)CH_2CH_2OCH=CH_2$ prepared according to the procedure described in U.S. Pat. No. 3,078,245, hereby incorporated by reference.

Also suitable are ene-functional siloxanes such as acryloyl-functional siloxanes (e.g., 1,3-bis[(p-acryloxymethyl)phenethyl]tetramethyldisiloxane); methacryloyl-functional siloxanes (e.g., 1,3-bis(3-methacryloxypropyl)tetramethyldisiloxane and siloxanes such as that commercially available from Hüls America under the trade designation "PS406"); allyl-functional siloxanes (e.g., the hydrolysis product of allyldimethylchlorosilane); vinyl-functional siloxanes (e.g., 1,3-divinyltetramethyldisiloxane, 1,3-divinyl-1,3-diphenyl-dimethyldisiloxane, 1,1,3,3-tetravinyldimethyldisiloxane, and 1,3,5,7-tetravinyltetramethylcyclotetrasiloxane); and hexenyl-functional siloxanes (e.g., 1,3-bis(6-hex-1-enyl)tetramethyldisiloxane, which is the hydrolysis product of 6-hex-1-enyldimethylchlorosilane).

Also useful are allyl-functional, vinyl ether-functional, and (meth)acrylated oligomers of polyurethanes, polyesters, polyols, alkylene oxides, polybutadienes, or epoxies. An example of a suitable acrylated polybutadiene is SARTOMER CD 5000 (commercially available from Sartomer Co.). A useful acrylated polyester is SARTOMER 609 (from Sartomer Co.) and a suitable acrylated polyurethane is SARTOMER 9610 (Sartomer Co.). Other useful acryl oligomers include those sold under the trade name "Ebecryl" by Radcure Specialties and the trade name "Photomer" from Diamond Shamrock.

The preferred acid reactants for use with Class I matrix reactants are unsaturated carboxylic acids and mono-esters of unsaturated dicarboxylic acids.

(2) Class II includes multi- and mono-functional thiols. Examples of suitable mono-functional thiols include isooctyl 3-mercaptopropionate. Preferred multi-functional thiols have the general formula $Z[OCO(CH_2)_nSH]_m$ where Z is a polyvalent organic moiety which is a $CH_{0-3}$ group-containing nucleus of a tri- or tetravalent alcohol of the type of glycerol or pentaerythritol, m is 3 or 4, and n is an integer between 1 and 5, inclusive. Specific examples include trimethylolpropane tris(3-mercaptopropionate) and pentaerythritol tetra(3-mercaptopropionate).

Also useful are mercapto-functional siloxanes (e.g., poly(3-mercaptopropylmethylsiloxane), or oligomers or copolymers thereof; 1,1,3,3-tetramethyl-1,3-bis(3--mercaptopropyl)disiloxane; and siloxanes such as that commercially available from Hüls America under the trade designation "PS405").

The thiols may be included as part of UV polymerizable systems based on thiol-ene chemistry in which one or more multi- or mono-functional enes (e.g., a mono- or multi-functional allyl, acrylate, methacrylate, or combination thereof) reacts with the thiol. Commercially available materials based upon thiol-ene chemistry include NOA 65 and NOA 68, each of which includes a photoinitiator and is available from Norland Products, Inc. New Brunswick, N.J., and compositions commercially available under the trade designation RCC-15C, RCC-15D, RCP-611, and WCC-2B from W. R. Grace & Co., Atlanta, Ga.

The preferred acid reactants for use with Class II matrix reactants are mercapto-functional carboxylic acids and unsaturated carboxylic acids.

(3) Class III includes multi- and mono-functional silicon hydrides. Examples of suitable mono-functional silicon hydrides include trimethylsilane and dimethylphenylsilane. Examples of suitable multi-functional silicon hydrides include dimethylsilane, diphenylsilane, and methylphenylsilane. Also suitable are hydrosiloxanes (e.g., 1,1,3,3-tetramethyldisiloxane; 1,3,5,7,9-pentamethylcyclopentasiloxane; phenyltris(dimethylsiloxy)silane; and 1,3,5,7-tetramethylcyclotetrasiloxane).

The preferred acid reactants for use with Class III matrix reactants are unsaturated carboxylic acids and mono-esters of unsaturated dicarboxylic acids.

(4) Class IV includes multi- and mono-functional alcohols. Examples of suitable multi-functional alcohols include those having molecular weights between 200 and 3000 g/mol, e.g., polyethylene oxide diols commercially available from Aldrich Co., Milwaukee, Wis.; diols commercially available under the trade designation "Terathane" from E. I. du Pont de Nemours & Co., Wilmington, Del.; and "Tone 0201" commercially available from Union Carbide, Danbury, Conn. Examples of suitable mono-functional alcohols include 1-octanol, 1-decanol, and 1-dodecanol. Also useful are carbinol-functional siloxanes (e.g., 1,3-bis(4-hydroxybutyl)tetramethyldisiloxane and 1,3-bis(hydroxypropyl)tetramethyldisiloxane).

The preferred acid reactants for use with Class IV matrix reactants are alcohol-functional carboxylic acids.

(5) Class V includes epoxies. Examples of suitable epoxies include Bostik 7575 commercially available from Emhart Chemical Group and Epon 828 commercially available from Shell Oil Co. Also useful are epoxy-functional siloxanes (e.g., 1,3-bis(glycidoxypropyl)tetramethyldisiloxane).

The preferred acid reactants for use with Class V matrix reactants are alcohol-functional, amino-functional, and/or mercapto-functional carboxylic acids.

(6) Class VI includes isocyanates. Examples include isophorone diisocyanate, hexamethylene diisocyanate, and Desmodur N100 (commercially available from Mobay, Pittsburgh, Pa.). Also useful are isocyanato-functional siloxanes (e.g., 1,3-bis(3-isocyanatopropyl)tetramethyldisiloxane).

The preferred acid reactants for use with Class VI matrix reactants are alcohol-functional, amino-functional, and/or mercapto-functional carboxylic acids.

(7) Class VII includes multi- and mono-functional amines. Examples include amine-functional oligomers such as those sold under the trade name "Jeffamine" by Texaco Co., Houston, Tex. and amine-functional siloxanes such as siloxanes commercially available from Hüls America under the trade designation "PS401;" 1,3-bis(4-aminobutyl)tetramethyldisiloxane; and 1,3-bis(3-aminopropyl)tetramethyldisiloxane).

The preferred acid reactants for use with Class VII matrix reactants are amino-functional carboxylic acids.

The particular choice of matrix reactant (or combination thereof) will depend upon the desired physical characteristics of the final film. For example, the matrix reactants may be chosen such that the refractive index of the polymerized matrix (including dissolved liquid crystal) matches the ordinary index of refraction (no) of the liquid crystal material. However, in choosing the amounts and identities of matrix reactants, several criteria generally apply.

First, it is desirable to choose matrix reactants to adjust polymerization rate (and thereby optimize, e.g., haze, switching voltage, and droplet structure of the PDLC film 12, as well as allow the use of lower liquid crystal contents). For example, allyls, vinyl silanes, vinyl ethers without maleates, and methacrylates tend to homopolymerize free-radically very slowly and therefore should preferably be used in combination with co-reactants that sustain and increase the polymerization rate. Such a combination will allow a high degree of conversion to be reached in a reasonable length of time. Examples of such co-reactants include acrylates, acrylamides, vinyl ether/maleate mixtures, and thiols. However, the amount of thiol is preferably limited (e.g., not to exceed about 20% by weight) and/or the functionality of the thiol is preferably high to avoid production of a relatively low molecular weight matrix and/or a matrix having a relatively low degree of crosslinking. This is because thiols are chain transfer agents that can terminate propagating polymer chains; moreover, thiols do not readily homopolymerize. In addition, when a relatively high percentage of slow-reacting reactants (e.g., allyls, vinyl silanes, or methacrylates) is used, the slow-reacting reactants preferably should have relatively large equivalent weights (e.g., oligomers) and the rate sustaining co-reactants should be of relatively low equivalent weight (e.g., monomers).

A second criterion relates to the functionality of the reactants. Specifically, it is desirable that at least some of the ene reactants are multifunctional in order to produce a crosslinked matrix. Crosslinking increases the resistance to damage caused by extreme temperatures and further reduces "memory." "Memory" refers to the change in zero-volt opacities before and after the device has been powered. Generally, the opacity difference (and thus the contrast between the on- and off-states) is greatest the first time the PDLC device is operated. On the other hand, too high a crosslinking level is undesirable because it shifts the switching voltage to higher voltages. The amount of multi-functional reactant(s) required will depend upon the structure and functionality of the particular reactant(s). Low molecular weight and/or high functionality (i.e., low equivalent weight) reactants (e.g., hexanediol diacrylate) and reactants with more rigid backbones between functional groups (e.g., 1,4-cyclohexanedimethanol divinyl ether) are preferably used at lower levels than flexible and/or high equivalent weight reactants (e.g., triethylene glycol divinyl ether). In addition, polar mono-functional reactants such as acrylic and methacrylic acid act as weak crosslinkers through hydrogen bonding.

It has also been found that optical properties such as haze can be minimized by optimizing the refractive index of the matrix reactants relative to that of the liquid crystal material. For example, it has been found that optimizing the relative levels of isooctyl acrylate and 2-phenoxyethyl acrylate (i.e., replacing some of the isooctyl acrylate with 2-phenoxyethyl acrylate, or vice-versa), minimizes haze in the powered PDLC device.

The following combinations are specific examples of useful acid reactant plus matrix reactant combinations:

(a) RCC-15C obtained without initiator (W. R. Grace & Co.), lauryl methacrylate, and methacrylic acid;

(b) RCC-15C obtained without initiator and with 50% less thiol (W. R. Grace & Co.), isooctyl acrylate, acrylic acid, triethylene glycol divinyl ether, and 2-phenoxyethyl acrylate;

(c) isooctyl acrylate, Vectomer 2010 (Allied-Signal Corp.; vinyl ether oligomer), Uralac 3004-102 (DSM Resins USA, Inc.; vinyl ether/maleate mixture), acrylic acid, and trimethylolpropane tris(3-mercaptopropionate);

(d) isooctyl acrylate, Vectomer 2020 (Allied-Signal Corp.; vinyl ether oligomer), acrylic acid, Uralac 3004-102, 2-phenoxyethyl acrylate, and trimethylolpropane tris(3-mercaptopropionate);

(e) isooctyl acrylate, Uralac 3004-300 (DSM Resins USA, Inc.; vinyl ether/maleate oligomer), acrylic acid, Uralac 3004-102, and trimethylolpropane tris(3-mercaptopropionate);

(f) isooctyl acrylate, Uralac 3004-300, acrylic acid, 2-phenoxyethyl acrylate, and Uralac 3004-102;

(g) isooctyl acrylate, Vectomer 4010 (Allied-Signal Corp.; vinyl ether monomer), methacrylic acid, 2-phenoxyethyl acrylate, and Uralac 3004-102;

(h) isooctyl acrylate, lauryl methacrylate, Vectomer 4020 (Allied-Signal Corp.; vinyl ether monomer), methacrylic acid, 2-phenoxyethyl acrylate, and Uralac 3004-102;

(i) isooctyl acrylate, 9460 (Monomer-Polymer & Dajac Laboratories, Inc.; allyl-functional oligomer), acrylic acid, 2-phenoxyethyl acrylate, and Uralac 3004-102; and (j) isooctyl acrylate, Vectomer 2020, acrylic acid, 2-phenoxyethyl acrylate, Uralac 3004-102, and diethyl fumarate.

(k) isooctyl acrylate, Vectomer 2020, acrylic acid, 1,4-cyclohexane dimethanoldivinyl ether, 2-phenoxyethyl acrylate, and trimethylolpropane tris(3-mercaptopropionate);

Liquid crystal materials useful in forming the droplets 14 may be nematic or cholesteric. Furthermore, they may have either positive or negative dielectric anisotropy. Particularly preferred (in the case of light modulating devices for automotive and architectural applications) are nematic liquid crystals having positive dielectric anisotropy. Commercially useful examples of such liquid crystal materials include LICRISTAL E7, BL006, BL009, ML1005, ML1008, 17151, 17153, 17315, 17722 (sometimes available under the trade designation BL038), and 17723 (sometimes available under the trade designation BL036), all of which are available from EM Industries, Hawthorne, N.Y. Mixtures of these liquid crystal materials may also be used. Low birefringence liquid crystal mixtures may be used as well, e.g., to provide a wider viewing angle.

Formation of an optically responsive film according to the invention is typically carried out in a phase separation process. Polymerization induced-phase separation has been found to be useful when the uncured polymer matrix material (in this case the combination of matrix reactant(s) and acid reactant(s)) is miscible with a low molecular weight liquid crystal material. Liquid crystal droplets form when the solubility of the liquid crystal material in the polymer matrix material decreases as a result of an increase in the molecular weight of the matrix material that occurs when the matrix material polymerizes to form a continuous phase. As the solubility of the liquid crystal material decreases, it phase separates from the polymer matrix material and forms droplets. The droplets increase in size and/or purity until the polymer matrix material locks in the final droplet morphology. The polymerization is carried out in the presence of the liquid crystal material, thereby enabling tailoring of the polymer matrix in terms of molecular weight, crosslink density, liquid crystal compatibility, and/or adhesion.

Although many polymer matrix material/liquid crystal combinations according to the invention form miscible mixtures at room temperature, in others it may be necessary to heat the combination slightly to form a homogeneous solution and prevent premature phase separation.

Matrix 16 can be prepared by thermal-initiated polymerization of the polymer matrix material or, more preferably, by photo-initiated polymerization of the polymer matrix material using low intensity UV radiation. Generally, the amount of photoinitiator is from about 0.01 part to about 10 parts per 100 parts of polymer matrix material by weight. Useful photoinitiators and/or photocatalysts may be of the free radical or cationic type. Examples of suitable free radical photoinitiators include the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl) oxime. Other suitable free radical polymerization initiating systems which may be used to effect the polymerization include 2,4-bistrichloro-methyl-6-substituted-s-triazines, and benzophenone with an amine, for example, benzophenone and p-(N,N-diethylamino) ethyl benzoate.

Examples of cationic catalysts for effecting polymerization include 'onium salts (e.g., diphenyl iodonium hexafluorophosphate and triphenyl sulfonium hexafluoroantimonate) and Lewis acid catalysts (e.g., cyclopentadienyl iron xylene hexafluorophosphate).

Low intensity UV lamps with different spectral responses are commercially available and may be used. The lamp should be selected such that the maximum output of the lamp is near the maximum absorption of the initiator. Fluorescent lamps (e.g., F40T12-350BL lamps commercially available from Osram Sylvania, Danvers, Mass.) in which the intensity of each lamp bank is in the range of about 0.25 to 10 mW/cm$^2$ (more preferably in the range of about 0.5 to 5 mW/cm$^2$) are suitable for this application. The total radiation to which the polymer matrix material is exposed preferably is in the range of about 100 to 1500 mJ/cm$^2$. The particular radiation intensity and total energy exposure requirements will vary depending on the liquid crystal, initiator, and polymer matrix materials.

Preferably, the liquid crystal material and the polymer matrix material are provided in approximately equal parts by weight, although the parts by weight of the liquid crystal material can vary from 10–90% by weight, even more preferably from 25–75% by weight. The optimum liquid crystal content is within 5% by weight of the concentration in which a further 5% by weight increase in liquid crystal content would yield a film in which the color of transmitted white light would change from slightly red to white.

Referring again to FIG. 1, although the optically responsive film 12 may be provided in free-standing form, in many applications it will be desirable to provide a sandwichlike construction in which the film 12 is interposed between a pair of first and second substrates 18 and 20, respectively. The thickness of the film preferably ranges from about 5 to 25 microns, more preferably in the range of about 10 to 25 microns, and most preferably in the range of about 15 to 21 microns. It will be understood that the device 10 may be provided with only a single substrate if, for example, the device is to be applied to a motor vehicle sunroof or an architectural window in which case the sunroof or the window have a function analogous to that of the second substrate.

At least one of the substrates 18 and 20 is at least partially transparent to allow incident visible light to pass therethrough. One of the substrates (preferably the one which light first impinges) may be modified to have selective light transmission characteristics, for example, to selectively transmit light of a wavelength corresponding to a certain color of the visible spectrum, ultraviolet light, or infrared light. Materials suitable for the substrates 18 and 20 include glass (which may be tempered) and plastics such as polyethylene terephthalate, polyethylene naphthalate, or other polyester or copolyester materials, polyethersulfone, polyimide, poly(methyl methacrylate), and polycarbonate. The substrates may be treated so as to enhance their abrasion and scratch resistance. The substrates are typically about 25 to 50 microns thick for flexible, durable constructions, although they may range in thickness from 1 microns to greater than 250 microns. If glass is employed for at least one of the substrates, the thickness may be in excess of 250 microns.

With continued reference to FIG. 1, in order to induce a change in the orientation of the liquid crystal droplets so as to cause the optically responsive film 12 to switch between the translucent off-state and the transparent on-state, it is necessary to apply an electric field across the film 12 (the film 12 may also be switched by applying a magnetic field across the same or by raising the temperature of the film above the clearing point temperature of the encapsulated liquid crystal). Accordingly, the device 10 may further comprise first and second electrodes 22 and 24, respectively, which are positioned intermediate the substrates 18 and 20 and the optically responsive film 12. The electrodes 22 and 24 are connected to, respectively, first and second leads 26 and 28 (e.g., using the connector described in Engfer et al., U.S. Ser. No. 08/011,973 entitled "Electrical Connector" filed Feb. 1, 1993 which is assigned to the same assignee as the present application and hereby incorporated by reference) which, in turn, are electrically connected to a variable power supply 30, preferably of the alternating current type (e.g., a zero-cross power supply). Preferably, the frequency of the alternating field should be in the range of 40 to 100 Hz. The field should alternate sufficiently rapidly so that a human observer of the device cannot perceive flickering. Thus, upon application of an electric field across the film 12, the optic axes of the liquid crystal droplets become aligned. If the refractive indices of the liquid crystal material and the polymer matrix have been closely matched, the film 12 will switch between the translucent off-state and the transparent on-state.

The electrodes 22 and 24 may be formed of various materials including chromium, indium oxide, tin oxide, stainless steel, indium tin oxide, gold, silver, copper, aluminum, titanium, cadmium stannate, transition metal oxides, and mixtures and alloys thereof. With the use of oxidizable electrode materials (e.g., silver) it may be desirable to environmentally protect the same with a thin passivating dielectric layer. The use of such a protective layer may enhance the ability of the electrode to resist thermal, chemical, moisture and/or ultraviolet-induced degradation such as is disclosed in Gilbert et al., U.S. patent application Ser. No. 07/819,274 entitled "Light Modulating Devices Incorporating an Improved Electrode" filed Jan. 10, 1992, which is assigned to the same assignee as the present application and hereby incorporated by reference. The electrodes must be capable of receiving an electrical input from the leads 26 and 28 and transmitting the same so as to apply an electric field across the film 12. Preferably the electrodes 22 and 24 are positioned adjacent to opposite sides or surfaces of the film 12 and extend over, across and parallel to the same.

At least one of the electrodes 22 and 24 preferably is at least partially transparent to visible light, although electrodes which provide preferential light transmission characteristics, such as color tint or ultraviolet or infrared filter, may be used. The electrodes 22 and 24 need not be equally transparent. At least one of the electrodes should provide a visible light transmission of at least 1%, preferably at least 10%, and more preferably at least 50%. The electrode coating should have a conductivity greater than 0.001 mhos per square. The electrode material may be coated or otherwise applied to the first and second substrates 18 and 20. Where only one of the substrates and one of the electrodes is transparent, the transparent substrate and transparent electrode should be on the same side of the device.

In operation, a user of the device 10 applies an electric field across the film 12 using power supplied by power supply 30, thereby rendering the device transmissive to light.

Whether the light modulating device is supplied as a free-standing film, with one substrate, or with two substrates, the device may be applied to a surface such as a motor vehicle sunroof, a motor vehicle side window, or an architectural window with, for example, suitable adhesive; preferably, the adhesive is optically transparent. As the device switches between the translucent off-state and the transparent on-state (in the case of nematic liquid crystal material having positive dielectric anisotropy), the device preferably has a uniform, even appearance.

The invention will be more fully understood with references to the following examples which are not to be construed as limiting the scope of the invention.

EXAMPLES

The following examples describe the preparation of light modulating devices based upon optically responsive PDLC films. In Examples 1–12, the device was prepared by first degassing an unpolymerized composition of matrix reactant(s) and liquid crystal and then pumping the composition to a coating die through which the composition was extruded onto the electrode side of an approximately 51 micron thick indium-tin oxide (ITO)-coated polyester film (90/10 indium/tin, 80 ohms/square, commercially available from Southwall Technologies, Palo Alto, Calif.) according to the process described in greater detail in Vesley et al., U.S. patent application Ser. No. 08/235,423 entitled "Precision Coating Process for Preparing Polymerizable Films" filed concurrently with, and assigned to the same assignee as, the present application, and hereby incorporated by reference.

Figure 2:
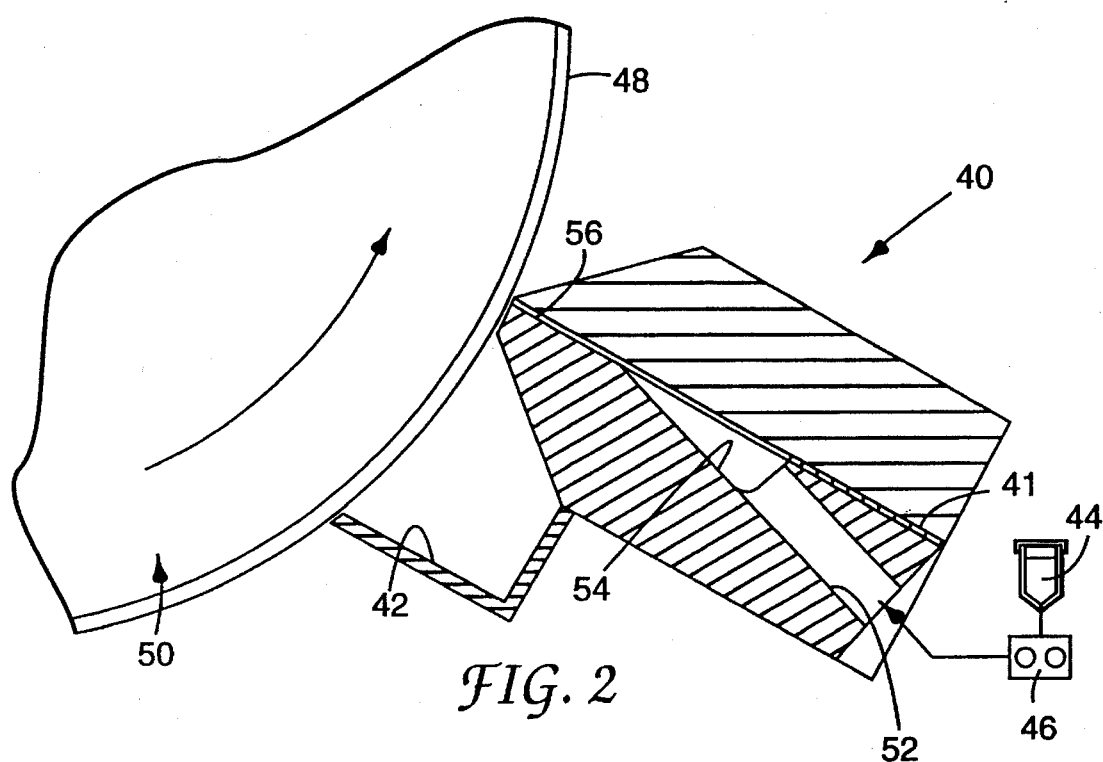
FIG. 2 is a cross-sectional view of an extrusion die useful in preparing films according to the invention.

The coating die 40 is shown in FIG. 2. The unpolymerized composition 44 was supplied by a pump 46 to the die 40 for application in the form of a continuous coating bead to the moving ITO-coated polyester film 48, supported by a backup roll 50. The backup roll 50 was a pacer roll driven by a Torquer Tachometer precision motor (available from Inland Motor Division, Bradford, Va.). The temperatures of the die and backup roll were controlled by circulating a temperature controlled fluid through them. Where indicated in the examples, vacuum was applied to vaccum chamber 42 to stabilize the coating bead. The unpolymerized composition 44 was supplied through a channel 52 to a manifold 54 for distribution through a slot 56 and coating onto the moving film 48. The height of slot 56 was controlled by means of a U-shaped shim 41 (typically made of brass or stainless steel).

Figure 3:
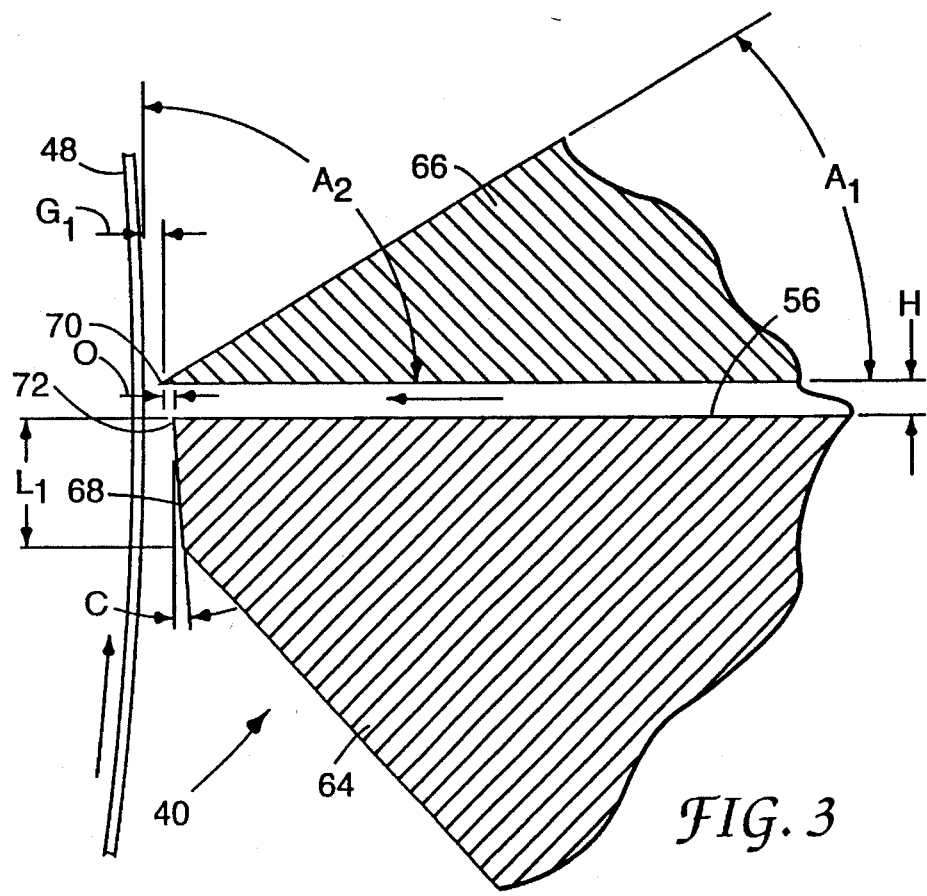
FIG. 3 is an enlarged cross-section view of the die shown in FIG. 2.

Referring to FIG. 3, die 40 consisted of an upstream bar 64 and a downstream bar 66. The lip of the upstream bar was formed as a curved land 68 and the lip of the downstream bar was formed as a substantially straight sharp edge 70 having an edge radius no greater than 10 microns. The radius of the curved land 68 was equal to the radius of the backup roll 50 plus a minimal, and non-critical, 0.13 mm allowance for coating gap and film thickness.

The length $L_1$ of the curved land 68 on the upstream bar 64 was 12.5 mm and the length $L_2$ of land 82 was 12.7 mm. The edge angle $A_1$ of the downstream bar 66 was 50°–60°. The die attack angle $A_2$ between the downstream bar 66 surface of the coating slot 56 and the tangent plane P through a line on the film 48 surface parallel to, and directly opposite, the sharp edge 70 was 95°.

The coating gap $G_1$ is the distance between the sharp edge 70 and the film 48. Slot height H is the distance between upstream bar 64 and downstream bar 66, and was controlled by controlling the thickness of shim 41. The slot height used in the examples was 0.152 mm. Overbite O is a positioning of the sharp edge 70 of the downstream bar 66, with respect to the downstream edge 72 of the curved land 68 on the upstream bar 64, in a direction toward the film 48.

Convergence C is a counterclockwise, as shown in FIG. 3, positioning of the curved land 68 away from a location parallel to the film 48, with the downstream edge 72 being the center of rotation. In the examples, convergence was 0.57°.

Vacuum land gap $G_2$ was 152 microns.

Figure 4:
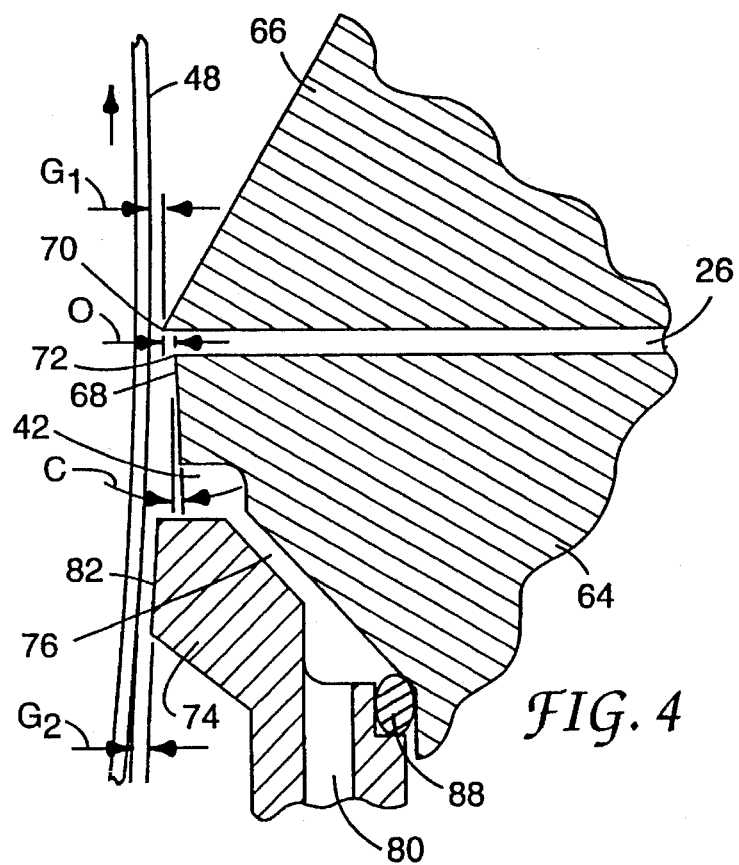
FIG. 4 is an enlarged cross-section view of an alternative die useful in preparing films according to the invention.

FIG. 4 is cross-sectional view of the extrusion die used to prepare films according to the invention and shows an alternate configuration where the vacuum bar 74 is isolated from the bottom die bar 65 by a flexible metal seal 88. This configuration allows adjustment of the coating gap $G_1$ and convergence C without affecting the vacuum land gap $G_2$.

The width of the coating produced by a given die was reduced where indicated by "deckling" the die and the vacuum chamber by concurrently incorporating a) shaped plugs to reduce the widths of the die cavity manifold 54 and vacuum chamber 42 to the deckling width and b) a shim into the die that has a shim slot width corresponding to the deckling width.

A second ITO-coated polyester film was unwound from a second unwind roll and passed around a 2.54 cm diameter sintered metal laminator bar where the second film was laminated to the coated face of the first film according to the procedure described in Vesley et al., U.S. patent application Ser. No. 08/285,366 entitled "Lamination Process for Coating" filed concurrently with, and assigned to, the same assignee as the present application, and hereby incorporated by reference. The laminator bar was located approximately 12 cm downstream from the backup roll such that the coated film was not in contact with the backup roll or other idler or takeup rolls at the point of lamination, and positioned so that the uncoated first substrate was depressed below the plane defined by the first film as it passed over the backup roll and the idler roll; the extent of depression is hereinafter referred to as "interference." Air pressure (approximately 2.4 bar) through the air bar laminator was adjusted to provide a cushion of air between the air bar laminator and the second film.

The uncured laminate construction was cured by passing the construction through a cooled curing chamber constructed of ultraviolet transparent Acrylite™ OP-4 (available from Cyro Industries, Mt. Arlington, N.J.), extending approximately 61 cm (2 feet) into a cure chamber equipped with two banks of fluorescent black lights (F20T12-350BL, available from Osram Sylvania, Danvers, Mass.), one bank positioned on each side of the laminate. Air temperature in the cooling chamber was monitored by a thermocouple mounted in the chamber under the second fluorescent bulb and controlled at the indicated temperature by introducing temperature controlled air. Each side of the laminate construction was exposed to approximately 250–600 mJ/cm$^2$ of radiation calculated from light intensities measured through a conductive electrode using a UVIBRITE radiometer (model number UBM365MO, available from Electronic Instrumentation and Technology, Inc., Sterling, Va.) equipped with a glass filter responsive between 300 and 400 nm, with a maximum transmission at 365 nm. The radiometer was specially calibrated to read in absolute intensity.

In the case of Examples 13–27 (and related comparative examples), the devices were prepared using a modified version of the procedure described in the aforementioned Miller et al. application. A puddle of unpolymerized liquid crystal/matrix composition was placed on the moving surface of an ITO-coated polyester film measuring 51 microns thick just prior to the nip gap of the precision coater, where a second ITO-coated PET film entered to form a laminate in which the ITO-coated surfaces were in a facing relationship. The temperature of the nip rolls was maintained at 27° C. by circulating a cooling solution from a constant temperature bath through the rolls. The nip gap was typically set between 0.11–0.14 mm to accommodate the thickness of the electrode materials and to allow for the desired PDLC matrix thickness.

After exiting the nip rolls, the sandwich-like construction was cured by transporting it into a temperature-controlled cure chamber where it was irradiated with long wavelength UV light for approximately 3 minutes. The intensity of the UV light was measured by a EIT UVIBRITE radiometer model number UBM365MO as described above.

Except where noted, the resulting light modulating devices prepared according to either method were characterized by measuring the peel strength of the PDLC film (according to Test Procedure A), electro-optical response (Test Procedure B), and haze (Test Procedure C).

Test Procedure A

The T-peel strengths of cured PDLC films were measured 1 day after a PDLC film (thickness=15–36 microns) disposed between a pair of 51 micron thick polyester electrodes had been made using a 2.54 cm wide strip of the PDLC film/electrode sandwich. The sandwich was configured such that the conductive sides of the electrodes were facing each other. The electrodes on the same end of the strip were curled back and placed into the jaws of an Instron Universal Testing Instrument Model TM equipped with a 200-gram load cell. The force required to peel apart the PDLC film from the electrodes at room temperature using a cross-head speed of 1.27 cm/minute was recorded. The force initially rose rapidly and then fluctuated around a constant or average value which was reported as the T-peel strength.

Test Procedure B

The electro-optical responses of the PDLC devices were characterized using a computer-controlled test stand consisting of an IBM personal computer interfaced with Kepco 125-1KVA-3T power supply, a Dyn-Optics Optical Monitor 590, and a Valhalla Scientific 2300 Series Digital Power Analyzer. The optics of the Dyn-Optics Optical Monitor were adjusted such that the specular transmission of photopically-filter light at an approximate 6° collection half angle was measured relative to an open beam.

A sample of a PDLC film/electrode sandwich measuring several square centimeters was attached to the leads of the power supply using a connector such as that described in the aforementioned Engfer et al. application. A 60 Hz voltage ranging from zero to 120 volts AC (VAC) was applied to the sample in 5 VAC increments and the specular transmission recorded.

Test Procedure C

The haze of the powered (120 VAC, 60 Hz) PDLC devices was measured using a Pacific Scientific Gardner XL-835 Colorimeter according to the manufacturer's instructions.

EXAMPLE 1

A PDLC device was prepared as described in the precision coating method above from a fluid containing (a) 55 parts of a mixture consisting of 30.0 wt. % RCC-15C curable matrix mixture obtained without initiator and with 50% less thiol (W. R. Grace, Atlanta, Ga.), 7.5 wt.% acrylic acid (Aldrich, Milwaukee, Wis.), 30.0 wt. % isooctyl acrylate, 15.0 wt. % 2-phenoxyethyl acrylate (Sartomer, West Chester, Pa.), 15.0 wt. % divinyl ether of triethylene glycol (International Specialty Products, Wayne, N.J.)), and 2.5 wt. % KB-1 photoinitiator (Sartomer, West Chester, Pa.), and (b)

45 parts BL036 liquid crystal mixture (EM Industries, Hawthorne, N.Y.) having a solution viscosity of 42 cps (measured on a Brookfield viscometer using a #3 spindle operating at 60 rpm). The fluid, which was degassed under vacuum for approximately 2 minutes at ambient temperature, was applied as a 15.2 cm (6 inch) wide strip to the electrode surface of an ITO-coated polyester film (90/10 indium/tin ratio, 80 ohms/square, 51 microns (2 mil) thick PET, available from Southwall Technologies, Palo Alto, Calif.) at a rate of approximately 152.4 cm/min (5 ft/minute) using an 88.9 cm die similar to that illustrated in FIG. 4 which was deckled to produce a narrower coating and configured with a 152 micron shim, a coating land having a length ($L_1$) of 12.7 mm, a vacuum land having a length $L_2$ of 12.7 mm, a 0.57° convergence, a 33 micron overbite, a vacuum land gap $G_2$ of 152 microns, a die attack angle $A_2$ of 95°, and a coating gap of 102 microns. The convergence of the vacuum bar was 0° and no vacuum was applied to the vacuum chamber during coating. Both the die and back-up roll were temperature controlled at 21° C. A pressure of 1.7 bar was maintained to the sintered metal bar during lamination and the lamination bar was adjusted to provide an interference of 3.6 mm. The resulting laminate was cured by exposure to UV light (intensity approximately 1.1 mW/cm$^2$) at about 21° C. to produce a PDLC film approximately 24±1 microns thick.

The PDLC device had on- and off-state transmissions of 73.1% and 1.2%, respectively, and a haze of 5.8%.

EXAMPLE 2

A PDLC device was prepared as described in Example 1 except that the fluid contained 500 parts of BL036 liquid crystal mixture and 333 parts of a mixture having the composition of 2.5 wt. % Esacure KB-1 photoinitiator, 7.5 wt. % acrylic acid, 30.0 wt. % isooctyl acrylate, 15.0 wt. % 2-phenoxyethyl acrylate 15.0 wt. % Uralac 3004-102 (DSM Resins, U.S., Inc., Elgin, Ill.), and 30.0 wt. % Uralac 3004-300 (DSM Resins, U.S., Inc., Elgin, Ill.). The die was configured to coat an 88.9 cm wide strip, with an overbite of 43 microns, a vacuum land gap $G_2$ of 24.5 mm and a vacuum of 1.9 mm Hg was applied to the vacuum chamber during coating. The ITO-coated polyester film used for the electrodes was approximately 130 microns (5 mils) thick. An air pressure of 3.4 bar was maintained to the laminator bar which was adjusted to provide an interference of 6.4 mm. The resulting laminate was exposed to UV light having an average intensity of approximately 1.68 mW/cm$^2$ at about 23° C. to produce a PDLC film approximately 18 microns thick.

The PDLC device had on- and off-state transmissions of 73.4% and 1.7%, respectively, and a haze of 5.3%.

EXAMPLE 3

A PDLC device was prepared as described in Example 1 except that the fluid contained (a) 125 parts of BL036 liquid crystal mixture and (b) 125 parts of the following mixture; 2.5 wt. % Esacure KB-1 photoinitiator, 7.5 wt. % methacrylic acid (Aldrich, Milwaukee, Wis.), 10.0 wt. % isooctyl acrylate, 15.0 wt. % lauryl methacrylate (Rohm Tech, Inc., Malden, Mass.), 20.0 wt. % 2-phenoxyethyl acrylate, 15.0 wt. % Uralac 3004-102, and 30.0 wt. % Vectomer 4020 (Allied-Signal, Inc., Morristown, N.J.). The die was configured with an overbite of 48 microns. An air pressure of 2.4 bar was maintained to the lamination bar which was adjusted to provide an interference of 4.1 mm. The resulting laminate was cured by exposure to UV light (intensity approximately 2.02 mW/cm$^2$) at about 22° C. to produce a PDLC film approximately 22–23 microns thick.

The PDLC device had on- and off-state transmissions of 72.2% and 1.2%, respectively, and a haze of 7.1%.

EXAMPLE 4

A PDLC device was prepared as described in Example 1 except that the fluid contained (a) 112.5 parts of BL036 liquid crystal mixture and (b) 137.5 parts of the following mixture; 2.5 wt. % Esacure KB-1 photoinitiator, 5.0 wt. % acrylic acid, 22.5 wt. % isooctyl acrylate, 10.0 wt. % trimethylolpropane tris(3-mercaptopropionate) (Aldrich, Milwaukee, Wis.), 30.0 wt. % Uralac 3004-102, and 30.0 wt. % Uralac 3004-300. The die was configured with an overbite of 43 microns and a vacuum of 1.9 mm Hg was applied to the vacuum chamber during coating. An air pressure of 2.4 bar was maintained to the laminator bar which was adjusted to provide an interference of 4.1 mm. The resulting laminate was cured by exposure to UV light (intensity approximately 2.02 mW/cm$^2$) at about 23° C. to produce a PDLC film approximately 33 microns thick.

The PDLC device had on- and off-state transmissions of 72.9% and 1.5%, respectively, and a haze of 6.6%.

EXAMPLE 5

A PDLC device was prepared as described in Example 1 except that the fluid contained (a) 150 parts of BL036 liquid crystal mixture and (b) 100 parts of the following mixture; 2.5 wt. % Esacure KB-1 photoinitiator, 7.5 wt. % methacrylic acid, 30.0 wt. % isooctyl acrylate, 15.0 wt. % 2-phenoxyethyl acrylate, 15.0 wt. % Uralac 3004-102, and 30.0 wt. % Vectomer 4010 (Allied Signal Inc., Morristown, N.J.). The die was configured with an overbite of 18 microns and a vacuum of 3.7 mm Hg was maintained to the vacuum chamber during coating. An air pressure of 2.4 bar was maintained to the laminator bar which was adjusted to provide and interference of 4.1 mm. The resulting laminate was cured by exposure to UV light (intensity approximately 1.99 mW/cm$^2$) at about 21° C. to produce a PDLC film 18 microns thick.

The PDLC device had on- and off-state transmissions of 71.1% and 1.7%, respectively, and a haze of 7.9%.

EXAMPLE 6

A PDLC device was prepared as described in Example 1 except that the fluid contained (a) 135 parts of BL036 liquid crystal mixture and (b) 165 parts of the following mixture; 2.5 wt. % Esacure KB-1 photoinitiator, 25.0 wt. % Vectomer 2010 (Allied Signal Inc., Morristown, N.J.), 7.5 wt. % acrylic acid, 15.0 wt. % isooctyl acrylate, 10.0 wt. % trimethylolpropane tris(3-mercaptopropionate), and 40.0 wt. % Uralac 3004-102. The die was configured with an overbite of 41 microns and a coating gap of 71 microns. A vacuum of 4.3 mm Hg was applied to the vacuum chamber during coating which was carried out at 29° C. and a speed of approximately 0.9 meters per minute. An air pressure of 2.4 bar was maintained to the laminator bar which was adjusted to provide an interference of 3.1 mm. The resulting laminate was cured by exposure to UV light (intensity approximately 2.01 mW/cm$^2$) at about 21° C. to produce a PDLC film approximately 30 microns thick.

The PDLC device had on- and off-state transmissions of 72.6% and 1.2%, respectively, and a haze of 5.8%.

EXAMPLE 7

A PDLC device was prepared as described in Example 1 except that the fluid contained (a) 135 parts of BL036 liquid crystal mixture and (b) 165 parts of the following mixture; 2.5 wt. % Esacure KB-1 photoinitiator, 10.0 wt. % Vectomer 2020 (Allied Signal Inc., Morristown, N.J.), 7.5 wt. % acrylic acid, 17.5 wt. % isooctyl acrylate, 12.5 wt. % 2-phenoxyethyl acrylate, 10.0 wt. % trimethylolpropane tris(3-mercaptopropionate), and 40.0 wt. % Uralac 3004-102. The die was configured with an overbite of 25 microns and a coating gap of 76 microns. The die temperature was maintained at 26.4° C. and a vacuum of 0.9 mm Hg was applied to the vacuum chamber during coating. An air pressure of 2.4 bar was maintained to the laminator bar which was adjusted to provide an interference of 3.1 mm. The resulting laminate was cured by exposure to UV light (intensity approximately 2.0 mW/cm$^2$) at about 25° C. to produce a PDLC film approximately 28–29 microns thick.

The PDLC device had on- and off-state transmissions of 73.9% and 1.2%, respectively, and a haze of 5%.

EXAMPLE 8

A PDLC device was prepared as described in Example 1 except that the fluid contained (a) 220 parts of BL036 liquid crystal mixture and (b) 180 parts of the following mixture; 2.5 wt. % Esacure KB-1 photoinitiator, 30.0 wt. % 9460 allyl aliphatic urethane (Monomer-Polymer & Dajac, Trevose, Pa.), 7.5 wt. % acrylic acid, 25.0 wt. % isooctyl acrylate, 20.0 wt. % 2-phenoxyethyl acrylate, and 15.0 wt. % Uralac 3004-102. The die was configured with an overbite of 51 microns and a coating gap set at 76 microns. A vacuum of 0.9 mm Hg was applied to the vacuum chamber during coating. An air pressure of 1.7 bar was maintained to the laminator bar which was adjusted to provide an interference of 3.8 mm. The resulting laminate was cured by exposure to UV light (intensity approximately 1.9 mW/cm$^2$) at about 22° C. to produce a PDLC film approximately 13–14 microns thick.

The PDLC device had on- and off-state transmissions of 73.8% and 1.2%, respectively, and a haze of 4.8%.

EXAMPLE 9

A PDLC device was prepared as described in Example 1 except that the fluid contained (a) 333 parts of BL036 liquid crystal mixture and (b) 267 parts of the following mixture; 2.5 wt. % Esacure KB-1 photoinitiator, 20.0 wt. % 9460 allyl aliphatic urethane, 5.0 wt. % acrylic acid, 30.0 wt. % isooctyl acrylate, 20.0 wt. % 2-phenoxyethyl acrylate, and 22.5 wt. % Uralac 3004-102. The die was configured with an overbite of 41 microns. A vacuum of 1.9 mm Hg was applied to the vacuum chamber during coating. An air pressure of 3.4 bar was maintained to the laminator bar which was adjusted to provide an interference of 3.8 mm. The resulting laminate was cured by exposure to UV light (intensity approximately 1.8 mW/cm$^2$) at about 21° C. to produce a PDLC film approximately 15 microns thick.

The PDLC device had on- and off-state transmissions of 74.8% and 1.2%, respectively, and a haze of 4.7%.

EXAMPLE 10

A PDLC device was prepared as described in Example 2 except that the fluid contained (a) 655 parts of BL036 liquid crystal mixture and (b) 516 parts of the following mixture; 2.5 wt. % Esacure KB-1 photoinitiator, 20.0 wt. % Vectomer 2020, 5.0 wt. % acrylic acid, 35.0 wt. % isooctyl acrylate, 15.0 wt. % 2-phenoxyethyl acrylate, 5.0 wt. % diethyl fumarate (Aldrich, Milwaukee, Wis.), and 17.5 wt. % Uralac 3004-102. The die was configured with an overbite of 41 microns and a vacuum of 1.9 mm Hg was applied to the vacuum chamber during coating. An air pressure of 1.7 bar was maintained to the laminator bar which was adjusted to provide an interference of 6.35 mm. The resulting laminate was cured by exposure to UV light (intensity approximately 1.54 mW/cm$^2$) at about 20° C. to produce a PDLC film approximately 14–15 microns thick.

The PDLC device had on- and off-state transmissions of 73.4% and 1.1%, respectively, and a haze of 4.5%.

EXAMPLE 11

A PDLC device was prepared as described in Example 1 using a fluid containing (a) 45 parts of a mixture consisting of 20.0 wt. % of the oligomer contained in RCC-15C (W. R. Grace, Atlanta, Ga.), 2.5 wt. % acrylic acid, 40.0 wt. % isooctyl acrylate, 25.0 wt. % 2-phenoxyethyl acrylate, 10.0 wt. % Uralac 3004-102, and 2.5 wt. % KB-1 photoinitiator, and (b) 55 parts BL036 liquid crystal mixture having a solution viscosity of 42 cps (measured on a Brookfield viscometer using a #3 spindle operating at 60 rpm). The fluid was applied to the electrode substrate at a rate of approximately 4.6 m/min using a die configured with a 3.8 micron overbite. A vacuum of 3.7 mm Hg was applied to the vacuum chamber during coating. Both the die and back-up roll were temperature controlled at 20° C. A pressure of 3.4 bar was maintained to the sintered metal bar during lamination and the lamination bar was adjusted to provide an interference of 3.8 mm. The laminate was cured at 21° C. by exposure to 244 mJ/cm$^2$ UV light at an average intensity of approximately 2.0 mW/cm$^2$ to produce a PDLC film approximately 19 microns thick.

The PDLC device had on- and off-state transmissions of 74.3% and 1.0%, respectively, and a haze of 4.0%.

EXAMPLE 12

A PDLC device was prepared as described in Example 1 except that the coating fluid had the following composition: (a) 50 parts of a mixture consisting of 20.0 wt. % Vectomer 2020, 5.0 wt. % acrylic acid, 25.0 wt. % isooctyl acrylate, 15.0 wt. % 2-phenoxyethyl acrylate, 10 wt. % trimethylolpropane tris(3-mercaptopropionate), 22.5 wt. % cyclohexane dimethanol divinyl ether (International Specialty Products, Wayne, N.J.), and 2.5 wt. % Escacure Kb-1, and (h) 50 parts BL036 liquid crystal mixture. The viscosity of the coating fluid was 134 cps (measured on a Brookfield viscometer using a #3 spindle operating at 60 rpm). The coating temperature was 21° C. and during lamination an air pressure of 2.4 bar was maintained to the laminator bar which was adjusted to provide an interference of 3.8 mm. The fluid was applied as a 15.2 cm (6 inch) wide strip to the electrode surface of an ITO-coated polyester film at a rate of approximately 152.4 cm/min (5 ft/minute) using the precision coating process described in Example 7 except that a 46 micron overbite, a coating gap of 102 microns, and a vacuum of 1.9 mm Hg (1 inch of water) was used to apply the solution at 22° C. The film was cured at 21° C. by exposing each side to approximately 530 mJ/cm$^2$ at an intensity of 1.0 mW/cm$^2$ to produce a PDLC film with a thickness of 23±1 microns.

The PDLC device had on- and off-state transmissions of 71.9% and 1.1%, respectively, and a haze of 4.8%.

EXAMPLES 13–17 AND C1

Curable fluids having the compositions indicated in Table 1 using the following ingredients: KB-1 photoinitiator (KB-1), lauryl methacrylate (LMA), RCC-15C obtained without initiator (W. R. Grace & Co., Atlanta, Ga.), methacrylic acid (MAA), and BL036 liquid crystal mixture. The composition of the fluids is expressed in weight percent where the weight percent of BL036 was calculated relative to the sum of the liquid crystal, matrix reactants, and catalyst being equal to 100:

TABLE 1

| Example | KB-1 | MAA | LMA | RCC-15C | BL036 |
|---|---|---|---|---|---|
| C1 | 2.0 | 0.0 | 10.0 | 88.0 | 45 |
| 13 | 2.0 | 2.0 | 9.8 | 86.2 | 45 |
| 14 | 2.0 | 5.0 | 9.5 | 83.5 | 45 |
| 15 | 2.0 | 9.8 | 9.0 | 79.2 | 45 |
| 16 | 2.0 | 15.2 | 8.4 | 74.4 | 45 |
| 17 | 2.0 | 29.4 | 7.0 | 61.6 | 45 |

1.5 grams of each unpolymerized matrix/liquid crystal fluid was cured by placing it on the moving surface of a 51 micron ITO-coated polyester film just prior to the nip gap of a precision coater where a second ITO-coated film enters to form a laminate, followed by exposure to UV light (average intensity approximately 2.0 mW/cm$^2$) at about 25°–26° C. The electro-optical responses of the PDLC devices were measured according to Test Procedure B and are listed in Table 2. T-peel values, measured according to Test Procedure A, are listed in Table 3. Multiple thickness and T-peel values reflect the fact that multiple portions of a single device were analyzed; except for the comparative example C1, where multiple portions of two devices were analyzed.

TABLE 2

| Example | Wt % MMA | Thickness (microns) | $T_{off}$ | $T_{on}$ |
|---|---|---|---|---|
| C1 | 0.0% | 24 | 1.1 | 65.8 |
| C1 | 0.0% | 19 | 1.3 | 70.5 |
| 13 | 2.0% | 22 | 1.5 | 71.3 |
| 14 | 5.0% | 20 | 0.8 | 70.6 |
| 15 | 9.8% | 20 | 1.9 | 45.6 |
| 16 | 15.2% | 21 | 7.3 | 40.2 |
| 17 | 29.4% | — | — | — |

TABLE 3

| Example | Wt % MMA | Thickness (microns) | T-peel Strength gm/2.54 cm | Failure Mode |
|---|---|---|---|---|
| C1a | 0.0% | 21 | 10.2 | Adhesive |
| C1b | 0.0% | 23 | 9.0 | Adhesive |
| C1c | 0.0% | 23 | 10.0 | Adhesive |
| C1d | 0.0% | 20 | 9.0 | Adhesive |
| C1e | 0.0% | 20 | 9.0 | Adhesive |
| C1f | 0.0% | 19 | 9.5 | Adhesive |
| 13a | 2.0% | 22 | 249.7 | Adhesive |
| 13b | 2.0% | 20 | 227.0 | Adhesive |
| 13c | 2.0% | 20 | 136.2 | Adhesive |
| 14a | 5.0% | 19 | 681.0 | Adhesive |
| 14b | 5.0% | 19 | 612.9 | Adhesive |
| 14c | 5.0% | 19 | 681.0 | Adhesive |
| 15a | 9.8% | 21 | 181.6 | Adhesive |
| 15b | 9.8% | 20 | 181.6 | Adhesive |
| 15c | 9.8% | 20 | 204.3 | Adhesive |
| 16a | 15.2% | 21 | 11.0 | Cohesive |
| 16b | 15.2% | 22 | 11.5 | Cohesive |
| 16c | 15.2% | 21 | 13.0 | Cohesive |
| 17a | 29.4% | 19 | 1.5 | Adhesive |
| 17b | 29.4% | 20 | 1.5 | Adhesive |
| 17c | 29.4% | 19 | 1.5 | Adhesive |

EXAMPLE 18–22 AND C2

Curable fluids having the compositions indicated in Table 4 were prepared using the following ingredients: KB-1 photoinitiator (KB-1), isooctyl acrylate (IOA), acrylic acid, (AA), Uralac 3004-300 (U300), 2-phenoxyethyl acrylate (PEA), Uralac 3004-102 (U102), and BL036 liquid crystal mixture. The composition of the fluids is reported in weight percent where the weight percent of BL036 was calculated relative to the sum of the liquid crystal, matrix reactants, and catalyst being equal to 100:

TABLE 4

| Example | KB-1 | AA | IOA | U300 | PEA | U102 | BL036 |
|---|---|---|---|---|---|---|---|
| C2 | 2.5 | 0.0 | 37.5 | 30.0 | 15.0 | 15.0 | 55.0 |
| 18 | 2.5 | 2.0 | 36.7 | 29.4 | 14.7 | 14.7 | 55.0 |
| 19 | 2.5 | 4.8 | 35.6 | 28.5 | 14.3 | 14.3 | 55.0 |
| 20 | 2.5 | 9.8 | 33.7 | 27.0 | 13.5 | 13.5 | 55.0 |
| 21 | 2.5 | 14.7 | 31.8 | 25.5 | 12.7 | 12.7 | 55.0 |
| 22 | 2.5 | 29.3 | 26.2 | 21.0 | 10.5 | 10.5 | 55.0 |

1.5 grams of each unpolymerized matrix/liquid crystal fluid was cured as described in Examples 11–15 except that the cure temperature was 26°–27° C. and the average intensity of the UV radiation was 2.1 mW/cm$^2$. The electro-optical properties of the PDLC devices were measured according to Test Procedure B and are listed in Table 5. T-peel values, measured according to Test Procedure A, are listed in Table 6. Multiple thickness and T-peel values reflect the fact that multiple portions of a single device were analyzed; except for the comparative example C1, where multiple portions of two devices were analyzed.

TABLE 5

| Example | Wt % AA | Thickness (microns) | $T_{off}$ | $T_{on}$ |
|---|---|---|---|---|
| C2 | 0.0% | 15 | 1.1 | 72.4 |
| C2 | 0.0% | 13 | 1.5 | 73.2 |
| 18 | 2.0% | 15 | 1.3 | 73.6 |
| 19 | 5.0% | 16 | 1.7 | 65.6 |
| 20 | 10.1% | 16 | 2.8 | 65.6 |
| 21 | 15.1% | 14 | 2.4 | 60.8 |
| 22 | 30.0% | 15 | 11.3 | 59.1 |

TABLE 6

| Example | Wt % AA | Thickness (mircons) | T-peel Strength grams/2.54 cm | Failure Mode |
|---|---|---|---|---|
| C2a | 0.0% | 16 | 1.5 | Adhesive |
| C2b | 0.0% | 17 | 1.5 | Adhesive |
| C2c | 0.0% | 16 | 1.5 | Adhesive |
| C2d | 0.0% | 14 | 1.5 | Adhesive |
| C2e | 0.0% | 13 | 1.5 | Adhesive |
| C2f | 0.0% | 14 | 1.3 | Adhesive |

TABLE 6-continued

| Example | Wt % AA | Thickness (microns) | T-peel Strength grams/2.54 cm | Failure Mode |
|---|---|---|---|---|
| 18a | 2.0% | 15 | 6.3 | Adhesive |
| 18b | 2.0% | 15 | 6.3 | Adhesive |
| 18c | 2.0% | 14 | 6.0 | Adhesive |
| 19a | 5.0% | 14 | 23.8 | Adhesive |
| 19b | 5.0% | 14 | 23.5 | Mixed |
| 19c | 5.0% | 14 | 24.0 | Mixed |
| 20a | 10.1% | 14 | 37.5 | Cohesive |
| 20b | 10.1% | 15 | 37.0 | Cohesive |
| 20c | 10.1% | 14 | 37.5 | Cohesive |
| 21a | 15.1% | 14 | 15.0 | Cohesive |
| 21b | 15.1% | 14 | 22.0 | Cohesive |
| 21c | 15.1% | 14 | 22.0 | Cohesive |
| 22a | 30.0% | 15 | 6.5 | Cohesive |
| 22b | 30.0% | 16 | 6.0 | Cohesive |
| 22c | 30.0% | 16 | 6.5 | Cohesive |

EXAMPLE 23 AND C3

A PDLC device was prepared as described in Examples 13–17 from a fluid containing (a) 50 parts of BL036 liquid crystal mixture and (b) 50 parts of the following mixture; 2.5 wt. % Esacure KB-1 photoinitiator, 38.1 wt. % 9460 allyl aliphatic urethane, 4.5 wt. % acrylic acid, 26.2 wt. % isooctyl acrylate, 19.1 wt. % 2-phenoxyethyl acrylate, and 9.6 wt. % Uralac 3004-102. The laminate was cured by exposure to UV light (intensity approximately 2.0 mW/cm$^2$) at about 24° C. to produce a PDLC film approximately 21 microns thick.

The PDLC device exhibited on- and off-state transmissions of 72.7% and 1.0%, respectively. The T-peel strength was 8 g/2.54 cm.

COMPARATIVE EXAMPLE C 3

A PDLC device was prepared as described in Example 23 from a fluid containing (a) 50 parts BL036 liquid crystal mixture and (b) 50 parts of the following mixture: 2.5 wt. % Esacure KB-1 photoinitiator, 39.9 wt. % 9460 allyl aliphatic urethane, 27.5 wt. % isooctyl acrylate, 20.0 wt. % 2-phenoxyethyl acrylate, and 10.1 wt. % Uralac 3004-102. A laminate was prepared as described above and cured by exposure to UV light (intensity approximately 2.0 mW/cm$^2$) at about 25° C. to produce a PDLC film approximately 20 microns thick.

The PDLC device exhibited on- and off-state transmissions of 75.6% and 1.2%, respectively. The T-peel strength was 1.5 g/2.54 cm.

EXAMPLE 24

A PDLC device was prepared as described in Examples 13–17 from a fluid containing (a) 50 parts BL036 liquid crystal mixture and (b) 50 parts of the following mixture; 2.5 wt. % Esacure KB-1 photoinitiator, 36.8 wt. % 9460 allyl aliphatic urethane, 7.7 wt. % acrylic acid, 25.3 wt. % isooctyl acrylate, 18.4 wt. % 2-phenoxyethyl acrylate, and 9.3 wt. % Uralac 3004-102. The laminate was cured by exposure to UV light (intensity approximately 2.0 mW/cm$^2$) at about 24° C. to produce a PDLC film approximately 20 microns thick.

The PDLC device exhibited on- and off-state transmissions of 72.9% and 1.0%, respectively. The T-peel strength was 35 g/2.54 cm.

Example C3 is also a comparative example for this device.

EXAMPLE 25 and C4

A PDLC device was prepared as described in Examples 13–17 from a fluid containing (a) 50.1 parts BL036 liquid crystal mixture and (b) 49.9 parts of the following mixture; 2.5 wt. % Esacure KB-1 photoinitiator, 19.0 wt. % 9461 allylated bisphenol A glycidyl ether oligomer (Monomer-Polymer & Dajac, Trevose, Pa.), 4.8 wt. % acrylic acid, 33.3 wt. % isooctyl acrylate, 9.5 wt. % 2-phenoxyethyl acrylate, and 30.9 wt. % Uralac 3004-102. The laminate was prepared as described above and cured by exposure to UV light (intensity approximately 2.0 mW/cm$^2$) at about 24° C. to produce a PDLC film approximately 29 microns thick.

The PDLC device exhibited on- and off-state transmissions of 60.3% and 0.8%, respectively. The T-peel strength was 12.5 g/2.54 cm.

COMPARATIVE EXAMPLE C4

A PDLC device was prepared as described in Example 25 from a fluid containing (a) 50 parts BL036 liquid crystal mixture and (b) 50 parts of the following mixture; 2.5 wt. % Esacure KB-1 photoinitiator, 20.0 wt. % 9461 allylated bisphenol A glycidyl ether oligomer, 35.0 wt. % isooctyl acrylate, 10.0 wt. % 2-phenoxyethyl acrylate, and 32.5 wt. % Uralac 3004-102. The laminate was cured by exposure to UV light (intensity approximately 2.0 mW/cm$^2$) at about 24° C. to produce a PDLC film approximately 28 microns thick.

The PDLC device exhibited on- and off-state transmissions of 74.0% and 1.6%, respectively. The T-peel strength was 2.25 g/2.54 cm.

EXAMPLE 26 AND C5

A PDLC device was prepared as described in Examples 13–17 from a fluid containing (a) 44.9 parts BL036 liquid crystal mixture and (b) 55.1 parts of the following mixture; 2.5 wt. % Esacure KB-1 photoinitiator, 38.5 wt. % of the oligomer contained in RCC-15C, 3.7 wt. % acrylic acid, 22.2 wt. % isooctyl acrylate, 4.2 wt. % 2-phenoxyethyl acrylate, and 28.8 wt. % Uralac 3004-102. The laminate was cured by exposure to UV light (intensity approximately 2.0 mW/cm$^2$) at about 24° C. to produce a PDLC film approximately 23 microns thick.

The PDLC device exhibited on- and off-state transmissions of 72.1% and 1.3%, respectively. The T-peel strength was 15 g/2.54 cm.

COMPARATIVE EXAMPLE C5

A PDLC device was prepared as described in Example 26 from a fluid containing (a) 45 parts BL036 liquid crystal mixture and (b) 55 parts of the following mixture; 2.5 wt. % Esacure KB-1 photoinitiator, 40.0 wt. % of the oligomer contained in RCC-15C, 23.1 wt. % isooctyl acrylate, 4.4 wt. % 2-phenoxyethyl acrylate, and 30.0 wt. % Uralac 3004-102. The laminate was cured by exposure to UV light (intensity approximately 2.0 mW/cm$^2$) at about 24° C. to produce a PDLC film approximately 23 microns thick.

The PDLC device exhibited on- and off-state transmissions of 75.3% and 2.0%, respectively. The T-peel strength was 1.1 g/2.54 cm.

EXAMPLE 27 AND C6

A PDLC device was prepared as described in Examples 13–17 from a fluid containing (a) 60 parts BL036 liquid crystal mixture and (b) 40 parts of the following mixture; 2.5 wt. % Esacure KB-1 photoinitiator, 9.5 wt. % triallyl-1,3,5-triazine-2,4,6-(2H,3H,5H)-trione (Aldrich, Milwaukee, Wis.), 4.7 wt. % acrylic acid, 50.0 wt. % isooctyl acrylate, 19.0 wt. % 2-phenoxyethyl acrylate, and 14.3 wt. % Uralac 3004-102. A laminate was cured by exposure to UV light (intensity approximately 2.0 mW/cm$^2$) at about 24° C. to produce a PDLC film approximately 19 microns thick.

The PDLC device exhibited on- and off-state transmissions of 72.3% and 1.0%, respectively. The T-peel strength was 11.5 g/2.54 cm.

COMPARATIVE EXAMPLE C6

A PDLC device was prepared as described in Example 27 from a fluid containing (a) 60 parts BL036 liquid crystal mixture and (b) 40 parts of the following mixture; 2.5 wt. % Esacure KB-1 photoinitiator, 10.0 wt. % triallyl-1,3,5-triazine-2,4,6-(1H,3H,5H)-trione, 52.5 wt. % isooctyl acrylate, 20.0 wt. % 2-phenoxyethyl acrylate, and 15.0 wt. % Uralac 3004-102. The laminate was cured by exposure to UV light (intensity approximately 2.0 mW/cm$^2$) at about 24° C. to produce a PDLC film approximately 19 microns thick.

The PDLC device exhibited on- and off-state transmissions of 75.3% and 0.9%, respectively. The T-peel strength was 1.6 g/2.54 cm.

Other embodiments are within the following claims.

For example, the matrix reactants (including the acid reactant(s)) may be pre-polymerized prior to addition of the liquid crystal. The liquid crystal and the polymerized matrix may then be mixed together (e.g., in the form of a solvent solution or aqueous-based emulsion) and cast as a film which upon drying yields an optically responsive film in which liquid crystal is dispersed throughout a polymer matrix.

What is claimed is:

1. An optically responsive film comprising liquid crystal dispersed in a polymer matrix comprising the reaction product of (1) one or more polymerizable matrix reactants other than an acid reactant and (2) at least one acid reactant copolymerizable with said one or more matrix reactants in an amount ranging from about 2 to about 15 weight percent, said amount being sufficient to enhance the T-peel strength of said film by a factor of at least 2 relative to the same film prepared in the absence of said acid reactant, said acid reactant comprising an unsaturated carboxylic acid, a mono-ester of a dicarboxylic acid, an amine-functional carboxylic acid, a hydroxy-functional carboxylic acid, a mercapto-functional carboxylic acid, or a sulfonic acid.

2. The optically responsive film of claim 1 wherein the amount of said acid reactant is sufficient to enhance the T-peel strength of said film by a factor of at least 3 relative to the same film prepared in the absence of said acid reactant.

3. The optically responsive film of claim 1 wherein said acid reactant comprises an unsaturated carboxylic acid.

4. The optically responsive film of claim 3 wherein said unsaturated carboxylic acid comprises acrylic acid.

5. The optically responsive film of claim 3 wherein said unsaturated carboxylic acid comprises methacrylic acid.

6. The optically responsive film of claim 1 wherein said acid reactant comprises an amine-functional carboxylic acid.

7. The optically responsive film of claim 1 wherein said acid reactant comprises a hydroxy-functional carboxylic acid.

8. The optically responsive film of claim 1 wherein said acid reactant comprises a mercapto-functional carboxylic acid.

9. The optically responsive film of claim 1 wherein said acid reactant comprises a sulfonic acid.

10. The optically responsive film of claim 1 wherein said acid reactant comprises a mono-ester of an unsaturated dicarboxylic acid.

11. The optically responsive film of claim 1 wherein said matrix reactant comprises a mono- or multi-functional ene.

12. The optically responsive film of claim 11 wherein said ene comprises a multi- or mono-functional acrylate, methacrylate, vinyl ether, or combination thereof.

13. The optically responsive film of claim 11 wherein said acid reactant comprises an unsaturated carboxylic acid.

14. The optically responsive film of claim 11 wherein said ene comprises a multi- or mono-functional acrylate, methacrylate, vinyl ether, or combination thereof and said acid reactant comprises an unsaturated carboxylic acid.

15. The optically responsive film of claim 1 wherein the amount of said acid reactant ranges from about 2 to about 10 weight percent.

16. The optically responsive film of claim 1 wherein said matrix reactant comprises a mono- or multi-functional thiol.

17. The optically responsive film of claim 1 wherein said matrix reactant comprises a mono- or multi-functional silicon hydride.

18. The optically responsive film of claim 1 wherein said matrix reactant comprises a mono- or multi-functional epoxy.

19. The optically responsive film of claim 1 wherein said matrix reactant comprises a mono- or multi-functional alcohol.

20. The optically responsive film of claim 1 wherein said matrix reactant comprises a mono- of multi-functional isocyanate.

21. The optically responsive film of claim 1 wherein said matrix reactant comprises a mono- or multi-functional amine.

22. An optically responsive film comprising liquid crystal dispersed in a polymer matrix comprising the reaction product of (1) one or more polymerizable matrix reactants other than an acid reactant and (2) at least one acid reactant copolymerizable with said one or more matrix reactants in an amount ranging from about 2 to about 15 weight percent, said acid reactant comprising an unsaturated carboxylic acid, a mono-ester of a dicarboxylic acid, an amine-functional carboxylic acid, a hydroxy-functional carboxylic acid, a mercapto-functional carboxylic acid, or a sulfonic acid.

23. A light modulating device comprising an optically responsive film to which an electric field is applied through a pair of electrodes, said optically responsive film comprising liquid crystal dispersed in a polymer matrix that comprises the reaction product of (1) one or more polymerizable matrix reactants other than an acid reactant and (2) at least one acid reactant copolymerizable with said one or more matrix reactants in an amount ranging from about 2 to about 15 weight percent, said amount being sufficient to enhance the T-peel strength of said film by a factor of at least 2 relative to the same film prepared in the absence of said acid reactant, said acid reactant comprising an unsaturated carboxylic acid, a mono-ester of a dicarboxylic acid, an amine-functional carboxylic acid, a hydroxy-functional carboxylic acid, a mercapto-functional carboxylic acid, or a sulfonic acid.

24. The light modulating device of claim 23 wherein the amount of said acid reactant ranges from about 2 to about 10 weight percent.

* * * * *

UNITED STATES PATENT AND TRADEMARK OFFICE
CERTIFICATE OF CORRECTION

PATENT NO. : 5,593,615
DATED : Jan. 14, 1997
INVENTOR(S) : Nerad et al.

It is certified that error appears in the above-indentified patent and that said Letters Patent is hereby corrected as shown below:

Col. 5, line 53      "$C_5$" should be —$C_8$—

Col. 18, line 49      "(h)" should be —(b)—

Col. 23, line 7      "(2H,3H,5H)" should be —(1H,3H,5H)—

Signed and Sealed this

Eighth Day of April, 1997

Attest:

BRUCE LEHMAN

Attesting Officer      *Commissioner of Patents and Trademarks*